March 25, 1969

JAMES E. WEBB  
ADMINISTRATOR OF THE NATIONAL AERONAUTICS  
AND SPACE ADMINISTRATION  
LIGHT RADIATION DIRECTION INDICATOR WITH  
A BAFFLE OF TWO PARALLEL GRIDS 3,435,246

Filed Feb. 9, 1966

*INVENTOR.*  
JAMES W. MILDICE

March 25, 1969
JAMES E. WEBB
3,435,246
ADMINISTRATOR OF THE NATIONAL AERONAUTICS
AND SPACE ADMINISTRATION
LIGHT RADIATION DIRECTION INDICATOR WITH
A BAFFLE OF TWO PARALLEL GRIDS
Filed Feb. 9, 1966
Sheet 3 of 3
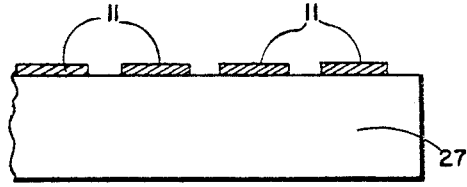
FIG. 5a
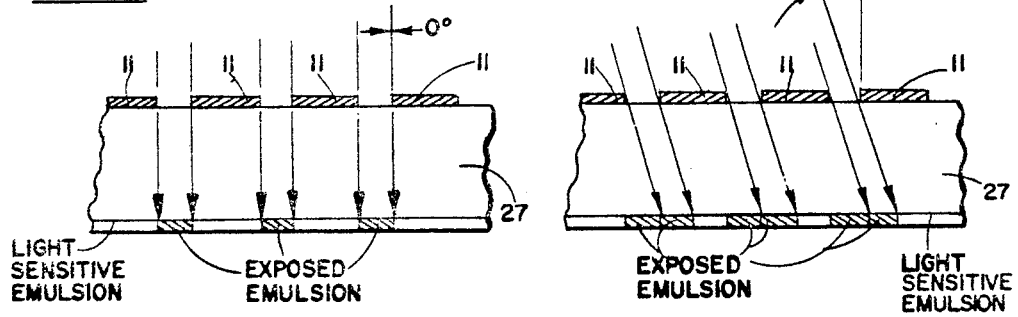
FIG. 5b
FIG. 5
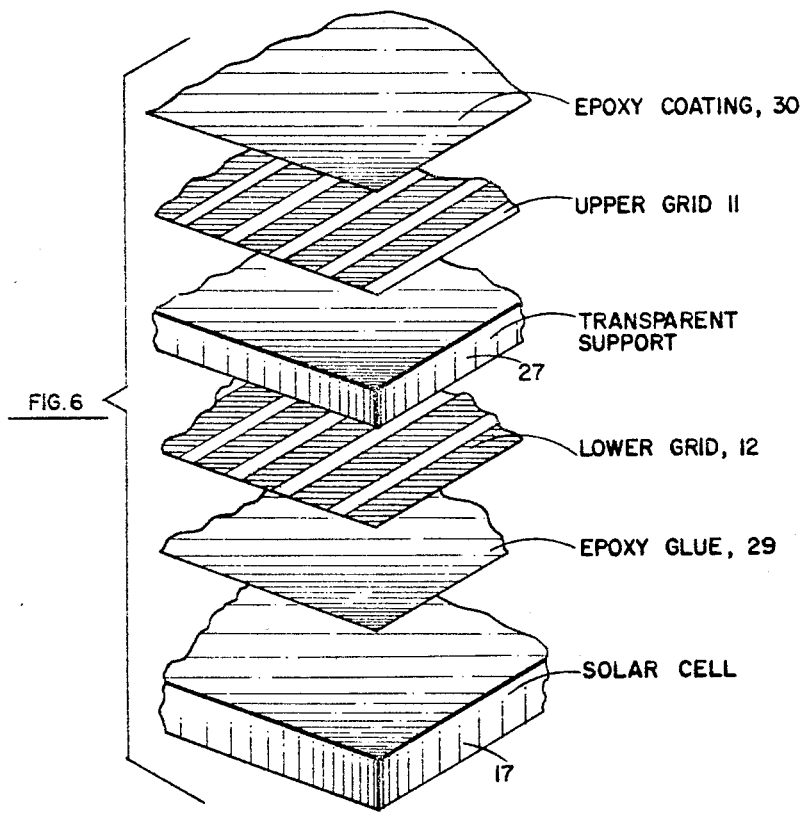
FIG. 6
INVENTOR.
JAMES W. MILDICE
BY
*Howard B. Scheckman*
ATTORNEYS

United States Patent Office 3,435,246
Patented Mar. 25, 1969

3,435,246
LIGHT RADIATION DIRECTION INDICATOR WITH A BAFFLE OF TWO PARALLEL GRIDS
James E. Webb, Administrator of the National Aeronautics and Space Administration with respect to an invention of James W. Mildice, San Diego, Calif.
Filed Feb. 9, 1966, Ser. No. 526,665
Int. Cl. H01j 3/14
U.S. Cl. 250—237                                          4 Claims

ABSTRACT OF THE DISCLOSURE

A light radiation direction sensor, comprising a photoelectric sensitive cell or sensor, in front of which a light baffle is positioned, to limit the light which may impinge upon the sensor only to light radiating towards the sensor from directions in a unipolar direction component, with respect to a perpendicular direction in a plane perpendicular to the sensor and tranversely of coplanar arrays of mutually parallel, regularly spaced longitudinal light interceptors. In the baffle's two coplanar arrays the mutually parallel, regularly spaced longitudinal light interceptors are positioned, so that an opposite edge of a corresponding longitudinal interceptor of each of the arrays is in juxtaposition in a spaced apart side-by-side relationship, thereby limiting the direction from which light may impinge on the sensor to directions on one side of a direction perpendicular to the coplanar arrays.

---

The invention described herein was made in the performance of work under a NASA contract and is subject to the provisions of section 305 of the National Aeronautics and Space Act of 1958, Public Law 85–568 (72 Stat. 435; 42 U.S.C. 2457).

The subject invention relates to a direction indicator and more particularly to apparatus for determining the direction of a source of light.

Frequently it is necessary to determine the direction of a source of light energy, such as the sun or a preselected star, relative to a local coordinate system. Such information may be required for achieving a desired orientation of a spacecraft. Such orientation may be required for guidance purposes in performing a desired trajectory. In the case of the sun, such directional information may also be desired for orientation of a space vehicle so as to minimize solar heating or to provide maximum exposure for solar batteries.

Where a signal is provided which is indicative of the deviation of the orientation of an optical sensor from the line of sight to such light source, such signal may be used in a servo tracking loop to cause such sensor to be reoriented toward such source. Many optical sensor schemes exist in the prior art for providing a signal indicative of the deviation of the orientation of a sensor from a line of sight to a selected light source. However, many of such schemes are not suited to measuring particularly small angular deviations. Others are not wholly passive analog seeker devices of sufficient reliability; but instead employ complex dither-motion scanning devices or other mechanically scanning means for determining the sense of an observed angular deviation. In other words, such prior art devices do not in general combine high reliability and improved sensitivity to small angular deviations.

By means of the concept of the subject invention, extremely small angular deviations in the relative orientation of a light source may be reliably sensed.

In a preferred embodiment of the subject invention, there is provided a photoelectric sensor having a sensitive area for providing an electrical signal in response to radiant energy impinging upon such area. There is also provided a like first and second lattice of mutually-parallel, regularly-spaced longitudinal light interceptors of uniform width arranged in a coplanar array. The two arrays are arranged in a mutually-parallel, face-to-face relation and oriented sufficiently out of registry so as to block from the light-sensitive area of the photocell, light rays normal to such arrays, while permitting light from a unipolar, uniplanar component of the deviation from such normal to illuminate an increasing portion of the light sensitive area of the photocell as such angular deviation component increases.

By means of a pair of such devices, sensitive to mutually opposite unipolar components of uniplanar angles, bipolar analog signals may be obtained which are suitable for angle tracking purposes. Accordingly, it is an object of the subject invention to provide analog direction sensing means.

It is another object of the invention to provide means for determining the direction of a radiant energy source.

It is still another object of the invention to provide light source direction sensing means of improved sensitivity.

It is a further object of the invention to provide passive sensing means for determining the deviation of the optical axis of a radiant energy detector from a line of sight to a radiant energy source.

These and other objects of the invention will become apparent from the following description, taken together with the accompanying drawings in which.

Figure 1A:
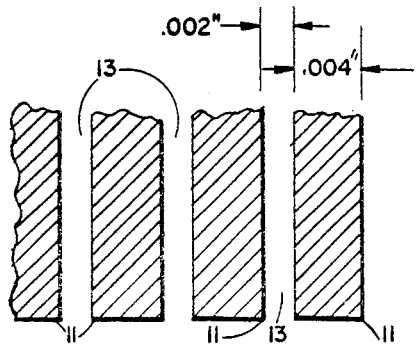
FIGURES 1a and 1b are top and end views respectively of a set of optical blocking grids, illustrating the inventive concept.

FIGURES 5, 5a, and 5b are a series of end views of a film illustrating the processing thereof to construct the set of grids depicted in FIGURE 1; and FIGURE 6 is an exploded view of an indicator assembly embodying the inventive concept.

In the figures, like reference characters refer to like parts.

Figure 1B:
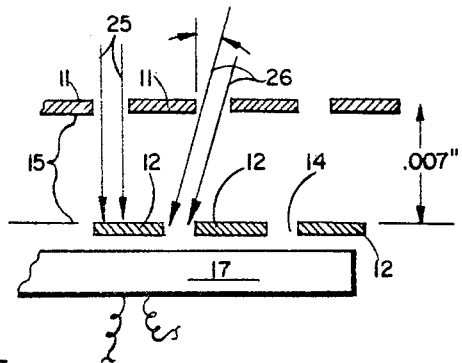

Referring now to FIGURES 1a and 1b, there is illustrated a set of optical blocking grids. FIGURE 1a depicts a plan view of an uppermost one of two stacked grids of regularly spaced, mutually parallel light interceptors 11 and 12; while FIGURE 1b illustrates an end view of such grids 11 and 12 in cooperation with the sensitive surface of a photoelectric sensor 17 as a light baffle therefor. Photoelectric sensor 17 may be of any type known in the art for providing an electrical signal in response to light or radiant energy impinging upon the sensitive area thereof.

Each of grids 11 and 12 comprises a coplanar array of mutually parallel, regularly-spaced light interceptors of uniform width, the width of each interceptor being at least as great as the lateral space 13 and 14 between adjacent interceptors, and preferably twice such lateral space. The two grids are oriented in a face-to-face mutually parallel relation and sufficiently out of lateral registry as to block light rays normal to the planes of the grids or coplanar arrays, while transmitting light having a unipolar component of angular deviation from such normal in a plane perpendicular to the planes of the grids and transversely of the longitudinal light interceptors 11 and 12.

In other words, a face of the baffle (formed by the two grids) is oriented and dimensioned as to cover, and be at least equally as extensive as, the sensitive area of photoelectric sensor 17, while the spacing or perpendicular distance 15 between the two grids of the baffle is preferably about two and one-half times the width of a grid element or longitudinal light interceptor.

The grids are mutually aligned laterally so that an edge of a longitudinal light interceptor of one grid is in juxtaposition with an opposite edge of the corresponding light interceptor of the other grid. For example, as illustrated in FIGURE 1b, the left edges of the grid elements of the lower coplanar grid array are aligned with the right edges of the corresponding grid elements of the upper coplanar grid array.

Hence, because of such alignment and the fact that the spacing between grid elements of the upper grid is less than the width of the grid elements of the lower grid, light rays 25 perpendicular to the planes of such coplanar grid arrays are blocked from sensor 17 by the baffle formed by such two grids. It is also to be appreciated that light rays from an angular direction slightly counterclockwise or to the left of such perpendicular direction, will be similarly blocked, while light rays 26 from a slightly clockwise direction (or to the right of such perpendicular) will not be blocked, but will be allowed to impinge upon photoelectric sensor 17. Such component of angular motion, resolved in the plane of FIGURE 1b (perpendicular to the coplanar arrays and transverse of the longitudinal members thereof is essentially a uniplanar component of motion. Further, because such baffle admits light slightly to one side of the perpendicular in such plane, and not light from the other side or other sense of direction, only a unipolar component of such uniplanar direction is allowed to impinge upon sensor 17.

The amount of light falling on sensor 17 through such baffle from the selected unipolar, uniplanar direction (i.e., from a direction slightly to the right of the perpendicular rays 25 in FIGURE 1b) tends to increase with the deviation of such direction θ from the normal or perpendicular, as is well understood in the art. In other words, the clockwise variation of the relative orientation of a collimated light source transversely of the longitudinal members 11, from an angular position defined by the juxtaposition of the juxtaposed opposite edges of corresponding grid members of the two grids, toward a second edge of the lower grid member, tends to produce a corresponding variation in the electrical output of sensor 17.

Accordingly, the arrangement of FIGURES 1a and 1b comprises means for indicating a unipolar uniplanar component direction of a source of radiant energy.

Figure 2:
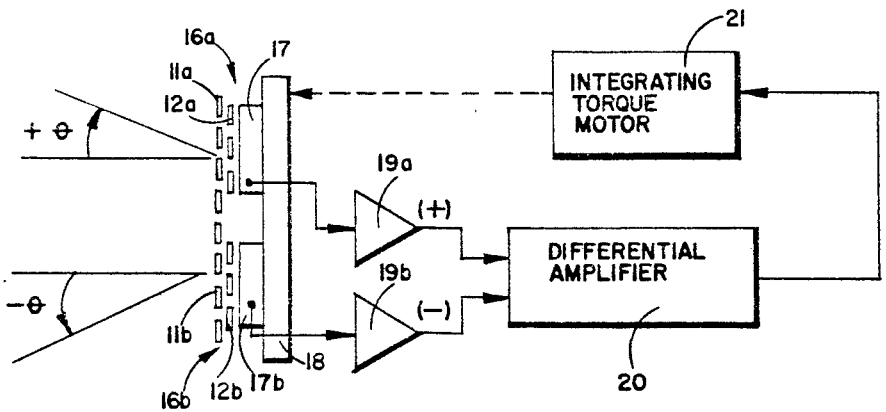
FIGURE 2 is a schematic arrangement of a radiant energy tracking system for tracking a radiant source and embodying the inventive concept of FIGURES 1a and 1b.

By means of a pair of devices employing the concept of FIGURES 1a and 1b, a bipolar uniplanar tracking function may be achieved, as shown in FIGURE 2.

Figure 3:
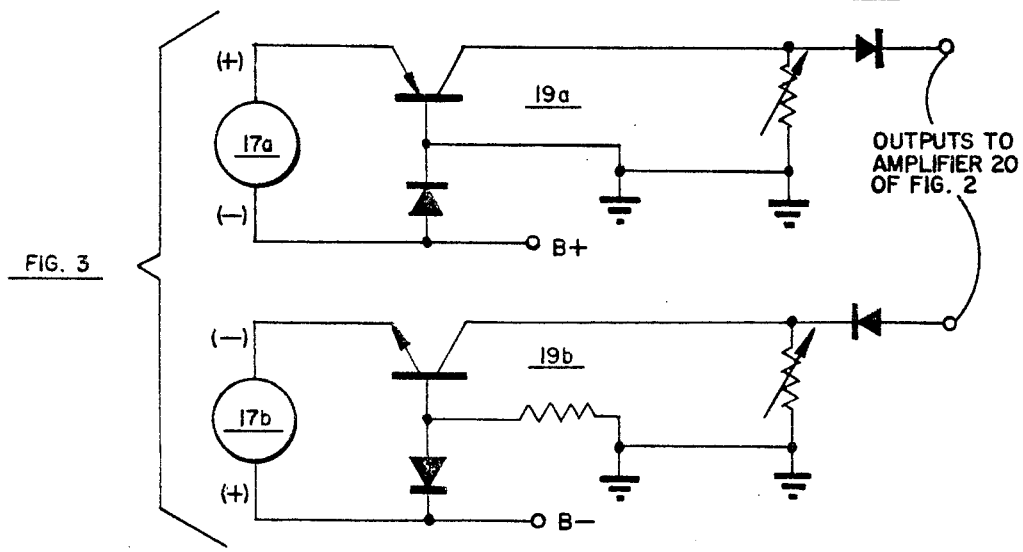
FIGURE 3 is a schematic circuit diagram of the signal amplifiers of FIGURE 2.

Referring to FIGURE 2, there is illustrated a uniplanar tracking servo for tracking the direction of a source of radiant energy. There is provided a first and second assembly 16a and 16b mounted on a tracking platform 18 for indicating a respective first and second mutually opposed unipolar component of direction in a common plane, each of assemblies 16a and 16b comprising a photoelectric sensor 17 and a pair of coplanar grid arrays 11 and 12 forming a light baffle, in accordance with the teaching of FIGURE 1b. The electrical outputs of sensors 17a and 17b are fed to a difference amplifier 20 for providing an output indicative of the amplitude difference therebetween. Such output of amplifier 20 may then be fed to a torque motor 21 which is drivingly arranged to orient platform 18 in a given plane in response to the sense of the amplitude difference detected by amplifier 20, the sense of the response of motor 21 being selected so as to reduce the magnitude of the amplifier output.

Where desired, the outputs of sensors 16a and 16b may be suitably amplified by separate amplifiers 19a and 19b prior to being compared. Where the outputs of sensors 16a and 16b are oppositely poled, then amplitude comparator 20 may be comprised of a summing amplifier, the construction and arrangement of which is well understood in the art. An exemplary arrangement of the separate amplifiers 19a and 19b for separately amplifying the outputs of sensors 17a and 17b to provide mutually oppositely poled outputs, may be comprised, for example, of the arrangement shown schematically in FIGURE 3.

Figure 4:
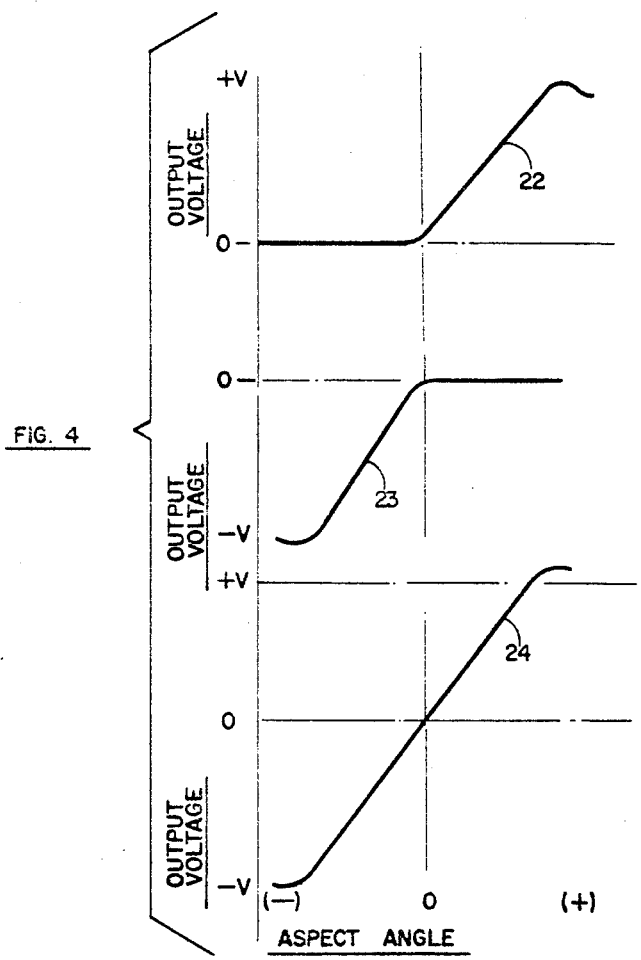
FIGURE 4 is a family of response curves illustrating the responses of several of the elements of FIGURE 2 as a function of uniplanar angle.

In the event of such opposite poling of the respective responses of sensors 17a and 17b, the response provided by each is as shown in FIGURE 4.

Referring to FIGURE 4, there is illustrated a family of curves depicting exemplary voltage responses of the amplifier of FIGURE 2 as a function of the component direction angle of a radiation source, relative to a plane normal to platform 20 and parallel to the sensitive plane of sensors 17a and 17b. Curves 22, 23 and 24 represent the outputs of amplifier 19a, 19b and 20, respectively. Curve 22 demonstrates a finite unipolar output other than null for sensor 17a only for angles of a positive sense, while curve 23 demonstrates a finite response of the opposite polarity for sensor 17b only for angles of a negative sense. In other words, sensor 17a is illuminated only by light rays from a uniplanar direction angle of one sense, while sensor 17b is illuminated only by light rays from a direction angle of the opposite sense. Hence, the summing of the oppositely poled outputs of sensors 17a and 17b by summing amplifier 20 provides an odd-valued function or bipolar output response indicative of the sum of curves 22 and 23, depicted by curve 24. Such analog response to a small angular deviation of the normal of tracking platform 18 from the line of sight to a radiant energy source-to-be-tracked, may therefore be used to drive platform servo 21 in a sense so as to reduce such deviation to zero, as is well understood in the servo art. Where desired, a tachometer (not shown) may be mounted on the output of servomotor 21 and the output thereof fed back as an additional input to summing amplifier 20 for anti-hunt and servo-damping purposes, in accordance with established servo design practices.

Hence, it is to be appreciated that the parallel light rays of a collimated light source or a distant star do not strike both of sensors 17a and 17b in FIGURE 2 concomitantly. Instead, such pair of sensors, due to the illustrated grid arrangement, has a null point when the pair face such light source; and when tilted to one side or the other from such null position, an appropriate one of the two sensors will emit a signal in response to light striking such sensor.

Although the angle-tracking device of FIGURE 2 has been described in terms of a simple, uniplanar tracking loop, it is clear that the concept of the invention would be equally useful in a dual plane angle tracker having four sensors comprising two sets or pairs of sensors arranged for sensing angular deviation in two mutually orthogonal planes. In such an arrangement, each pair of sensors would cooperate (substantially in the manner illustrated in FIGURE 2) with a respective one of two servo loops for torquing platform 18 about a respective one of two mutually orthogonal axes. The mechanical arrangement of such a platform and two servo motor drives is well understood in the art, especially in the art of monopulse tracking radars, for example. By means of such a dual planar sensing arrangement, yaw and pitch steering signals may be provided for attitude control of a satellite.

The unipolar uniplanar sensing elements themselves may be fabricated by means of lamination techniques applied to grid patterns developed photographically, as shown more particularly in FIGURES 5 and 6.

For example, a photographic master may be made from a single master grid drawing, as is well understood in the art. Then by means of photographic techniques, single grids may be produced on a transparent base such as, for example, a commercial film base. A first grid 11 may be photographically developed or photo-reduced upon one side (the top side) of the film base 27, as shown in FIGURE 5a. Then, the underside of the film 27 is coated with a layer of light-sensitive emulsion 28 and exposed through the top layer, as shown in FIGURE 5b, to a collimated source of light.

A similar second exposure is then made at the maximum intended angle for the associated grid geometry, prior to photographically processing or developing the film, as shown in FIGURE 5c. Then, upon the second and final processing of the film to develop the grids 12 on the underside thereof, the result is a pair of like grids 11 and 12 of FIGURE 1b having the desired registration.

Such film having the approximate grids may then be laminated with a solar cell, to form a completed sensor, as shown in FIGURE 6.

Referring to FIGURE 6, there is shown an exploded view of an integrated or laminated sensor design. The transparent support or film 27, having an upper and lower grid 11 and 12 developed in accordance with the processes described in connection with the description of FIGURE 5, is secured to solar cell 17 (or a photoelectric cell) by means of a thin layer 29 of clear epoxy cement, while a thin epoxy coating 30 is applied over the entire sandwich to protect the outer grid from physical damage.

Accordingly, there has been described means for sensing the angular deviation of a line of sight to a radiation source from a line normal to the surface of the sensor, whereby an electrical signal is provided which varies with such deviation.

Although the invention has been described and illustrated in detail, it is clearly to be understood that the same is by way of illustration only and is not to be taken by way of limitation, the spirit and scope of the invention being limited only by way of the terms of the appended claims.

What is claimed is:

1. In a light radiation direction indicator for indicating the radiation of light only from a selected unipolar direction component with respect to a perpendicular direction of a selected plane, the arrangement comprising: a light baffle having
    two like grids of regularly-spaced mutually parallel light interceptors in cooperation with a photoelectric sensor adjacent to said light baffle, each interceptor having a width of at least as great as the interval between adjacent interceptors of a common grid, said grids being oriented in a face-to-face mutually parallel relation, and sufficiently out of lateral registry as to block light rays normal to the planes of said grids, while transmitting light having a unipolar component of deviation therefrom in a plane perpendicular to said grids and transversely of said longitudinal interceptors, whereby said sensor provides an output only when light is received from said unipolar direction component.

2. Means for indicating a unipolar uniplanar component direction of a light source, comprising:
    a photoelectric sensor having a light sensitive area for providing an electrical signal in response to light energy impinging upon said area;
    a first and second coplanar array of mutually parallel, regularly spaced longitudinal light interceptors of uniform width, a first one of said arrays being fixedly arrayed across said light sensitive area, said coplanar arrays being mutually parallel and spaced apart, an opposite edge of a corresponding longitudinal interceptor of each of said arrays being in juxtaposition in a spaced apart side-by-side relation, the width of said longitudinal interceptors is at least as great as the interval between adjacent interceptors of each array, and in which the perpendicular distance of the spacing between said mutually parallel coplanar arrays is at least as great as the width of each of said longitudinal interceptors;
    whereby the variation of the relative orientation of a collimated light source transversely of said longitudinal members from an angular position, defined by the juxtaposition of said opposite edges, toward the second edge of the interceptors of said first array tends to produce a corresponding variation in the output of said sensor.

3. Means for indicating a uniplanar component direction of light source, comprising first and second assemblies for indicating first and second mutually opposed unipolar components of said uniplanar component direction, with respect to a direction perpendicular to said assemblies, each assembly comprising:
    a photoeletcric sensor having a light sensitive area for providing an output signal in response to light energy impinging upon said area;
    a first lattice and a second lattice of mutually parallel, regularly spaced longitudinal light interceptors of uniform width arranged in a coplanar array;
    a first one of said lattices being fixedly arrayed across said light sensitive area of said sensor;
    the coplanar arrays of said first and second lattices being mutually parallel and spaced apart, an opposite edge of a corresponding longitudinal interceptor of each of said lattices being in juxtaposition in a spaced-apart side-by-side relation, whereby said first and second lattices intercept all light directed from said source toward said sensor except for light from a unipolar component of said uniplanar component direction;
    said sensor in said first assembly responding to light from a first unipolar component with respect to said perpendicular direction, and said sensor of said second assembly responds to light from a second unipolar component direction, opposite said first unipolar component with respect to said perpendicular direction; and
    output means for utilizing the outputs of the sensors of said first and second assemblies to control the orientation thereof.

4. The arrangement as recited in claim 3 wherein said output means include amplifying means responsive to the outputs of the sensors in said first and second assemblies for providing a control output signal indicative of the difference between the outputs of said sensors and servo motor means responsive to said control output signal for adjusting the orientation of said assemblies so as to minimize the amplitude of the control output signal.

References Cited

UNITED STATES PATENTS

| | | | |
|---|---|---|---|
| 2,439,295 | 4/1948 | Hammond et al. | 250—237 X |
| 3,114,046 | 12/1963 | Cabaniss et al. | |
| 3,319,828 | 11/1965 | Foster | 250—203 |
| 3,304,028 | 2/1967 | Dryden. | |

JAMES W. LAWRENCE, *Primary Examiner.*

V. LAFRANCHI, *Assistant Examiner.*

U.S. Cl. X.R.

88—14; 250—203